United States Patent
Barfield et al.

(10) Patent No.: US 6,948,166 B2
(45) Date of Patent: Sep. 20, 2005

(54) SYSTEM AND METHOD FOR AUTOMATICALLY DE-INSTALLING PREVIOUSLY INSTALLED SOFTWARE BASED ON USER DEFINED PREFERENCES

(75) Inventors: Janel G. Barfield, Round Rock, TX (US); Matthew S. Cronk, Austin, TX (US); Kevin L. Fought, Austin, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 09/826,704

(22) Filed: Apr. 5, 2001

(65) Prior Publication Data

US 2004/0015956 A1 Jan. 22, 2004

(51) Int. Cl.[7] .............................................. G06F 9/45
(52) U.S. Cl. ...................................... 717/174; 717/168
(58) Field of Search ................................ 717/174, 168, 717/178, 170

(56) References Cited

U.S. PATENT DOCUMENTS

| | | | | |
|---|---|---|---|---|
| 6,100,887 A | * | 8/2000 | Bormann et al. ............ 715/764 |
| 6,178,551 B1 | * | 1/2001 | Sana et al. ................... 717/140 |
| 6,347,397 B1 | * | 2/2002 | Curtis .......................... 717/170 |
| 6,418,554 B1 | * | 7/2002 | Delo et al. ................... 717/174 |
| 6,453,469 B1 | * | 9/2002 | Jystad .......................... 717/174 |
| 6,698,018 B1 | * | 2/2004 | Zimniewicz et al. ........ 717/175 |
| 2002/0083430 A1 | * | 6/2002 | Kusuda et al. .............. 717/174 |
| 2004/0034794 A1 | * | 2/2004 | Mayer et al. ................ 713/200 |
| 2004/0133776 A1 | * | 7/2004 | Putzolu ....................... 713/153 |

* cited by examiner

*Primary Examiner*—John Chavis
(74) *Attorney, Agent, or Firm*—Herman Rodriguez; Edmond A. DeFrank

(57) ABSTRACT

The present invention is embodied in a system and method for managing software packages that are to be installed on a computer by automatically de-installing previously installed software based on user defined preferences to prevent trial, demo or unwanted software and its components from being unnecessarily kept on the user's computer. The present invention includes a de-install module that is associated with the process of installing software on the computer. The de-install module includes a time module that allows the user to choose the time period to keep the software package on the computer before the software is uninstalled.

20 Claims, 4 Drawing Sheets

SYSTEM AND METHOD FOR AUTOMATICALLY DE-INSTALLING PREVIOUSLY INSTALLED SOFTWARE BASED ON USER DEFINED PREFERENCES

BACKGROUND OF THE INVENTION

1. Field of the Invention

The present invention relates to a system and method for managing software packages that are to be installed on a computer. In particular, the present invention relates to system and method for automatically de-installing previously installed software based on user defined preferences, such as a time period.

2. Related Art

Computers are a regular part of the everyday lives of many people. Computers are typically used in one's home as well as one's business or work place. In order for a computer to operate, software must be present on the computer. Software is simply computer instructions or data or anything that can be stored electronically on the computer. Software is often divided into two categories. The first category is systems software, which includes the operating system and all the utilities that enable the computer to function. The second category is applications software, which includes programs that allow the user to apply the computer to practical applications, such as word processing programs, spreadsheet programs, database management programs, games, etc. Users can gains access to software packages by purchasing it at consumer stores.

Another way to gain access to software packages is by downloading the software package from the Internet. The Internet, via the World Wide Web (WWW), is a graphical and interactive computer environment for allowing a remote client computer connect with other host servers. Gaining access to software packages is typically accomplished by having the remote client user interact with information located on the host server via a WWW browser. The browser enables the remote client user to graphically interact with the server and access files, such as the software packages, for downloading.

However, many times users download or install software packages for trial or demo purposes only. Also, these software packages may not have known system or library incompatibilities at the time of the install. Only after installation and usage do problems arise that may be annoying or troublesome. Further, since these software packages are for trial or demo purposes, the software becomes unwanted or unnecessary to the system after the trial or demo period expires.

To avoid this problem, a user would first save potential libraries or files that the user knows (the user can request the install sequence from the software manufacturer) or believes might be overwritten by the new software package before installing the new software package. Next, the user would have to make a note of when the trial or demo period ended. Last, at the noted end of the trial period, the user would uninstall the unwanted software with an uninstall module (presumably included with the software package) and then manually restore the previously saved files and libraries.

Unfortunately, this process is tedious, time consuming and not easy for the typical or novice computer user. In addition, the user must manually keep track of when the trial or demo period ends. Further, since this process is manual, it's subject to human error, and thus is unreliable and dangerous (an inexperienced user can inadvertently destabilize an operating system).

Therefore, what is needed is a reliable and automated time based system and method for managing software packages that are to be installed on a computer. What is further needed is a system and method that automatically de-installs previously installed software based on user defined preferences, such as a predefined time period.

SUMMARY OF THE INVENTION

To overcome the limitations in the prior art described above, and to overcome other limitations that will become apparent upon reading and understanding the present specification, the present invention is embodied in a system and method for managing software packages that are to be installed on a computer. Basically, the present invention automatically de-installs previously installed software based on user defined preferences to prevent trial, demo or unwanted software and its components from being unnecessarily kept on the user's computer.

In general, the present invention includes a de-install module that is associated with the process of installing software on the computer. The de-install module includes a time module that allows the user to choose the time period to keep the software package on the computer before the software is uninstalled. The de-install module can be initiated at the start-up of the computer and then go into a temporary hidden mode that stills stays resident. In other words, during this mode, the de-install module is active, but hidden from the user and only activated when a software package initiates installation on the computer. Alternatively, the de-install module can be a module that is added to existing software packages as part of the software's uninstall module.

In particular, first, when the user initiates installation of a particular software package on the client machine, the de-install module is activated. Next, before the software package is installed on the user's computer, the user is provided with the option to have the software package and all of its associated components automatically de-installed after a user defined period of time has elapsed. If the user chooses the automatic de-install based on a time period, the software package is installed with the time module. Next, the software package is de-installed after the predetermined time period. If the user chooses not to have automatic de-install based on the time period, the software is installed without the time module.

In one embodiment, the de-install module tracks in real-time the step by step activity of the installation process and interjects to save and store original files or system settings as backup copies just before the original files or settings are modified or deleted by the installation process. This allows the original files and/or settings to be completely restored when the software is de-installed. Alternatively, the de-install module can collect in memory file changes (such as adding, renaming, replacing, or adding data to existing system or library files) that are made by the installation process. All activity that occurs during the installation process is logged so that the de-installation of the software is basically an exact reverse process of the installation. In yet another embodiment, the de-install module can save in memory all library files and system settings before the installation process and log the installation process so that any modified library file and/or settings can be completely restored when the software is de-installed. In another embodiment, the de-install module can save all files that exist within the directories that the installation process uses.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Introduction

Figure 1:
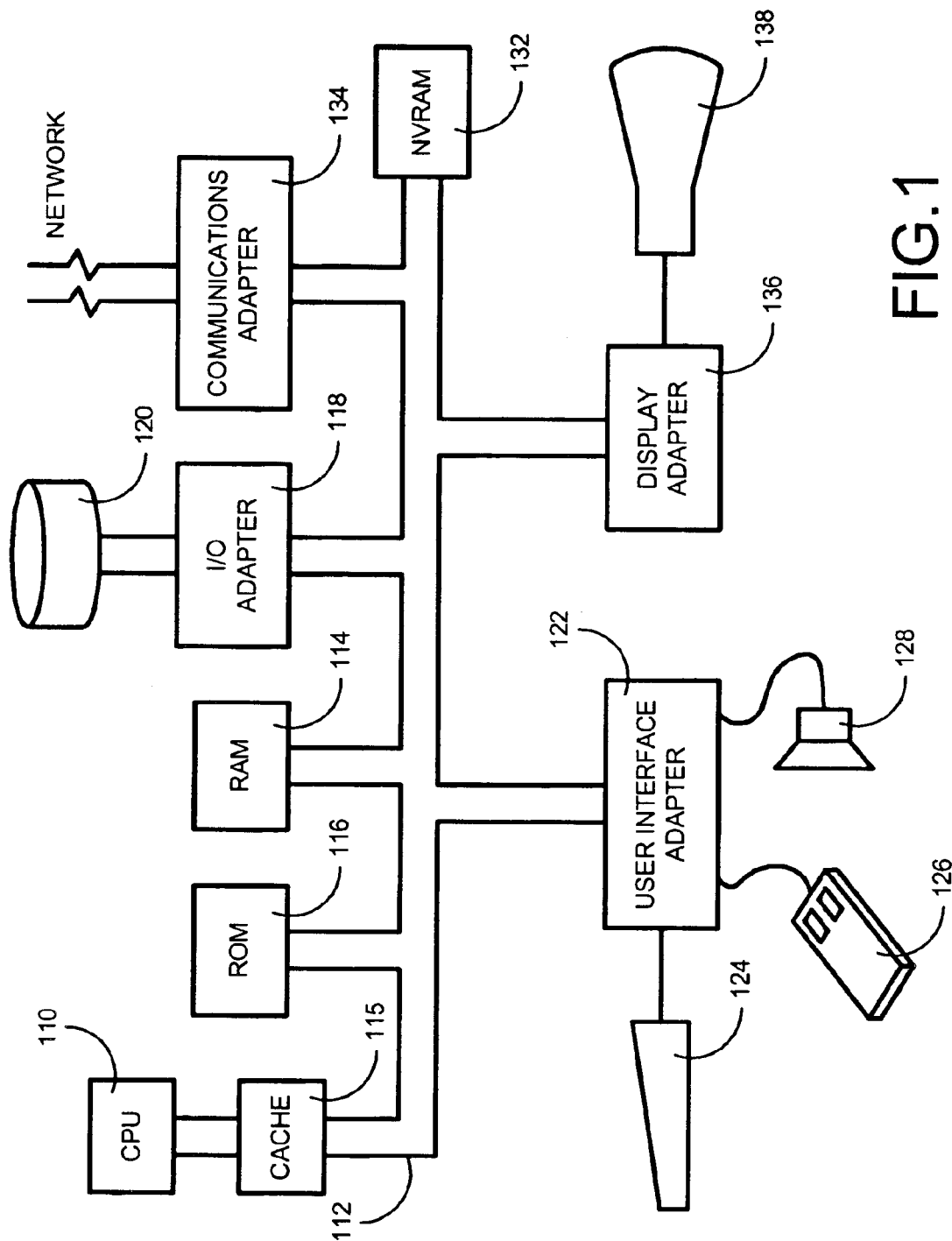
FIG. 1 illustrates a conventional hardware configuration for use with the present invention.

The preferred embodiments may be practiced in any suitable hardware configuration that uses a networked connection, such as computing system 100 illustrated in FIG. 1 or, alternatively, in a laptop or notepad computing system. Computing system 100 includes any suitable central processing unit 110, such as a standard microprocessor, and any number of other objects interconnected via system bus 112. For purposes of illustration, computing system 100 includes memory, such as read only memory (ROM) 116, random access memory (RAM) 114, and peripheral memory devices (e.g., disk or tape drives 120) connected to system bus 112 via I/O adapter 118. Computing system 100 further includes a display adapter 136 for connecting system bus 112 to a conventional display device 138. Also, user interface adapter 122 could connect system bus 112 to other user controls, such as keyboard 124, speaker 128, mouse 126, and a touchpad (not shown).

One skilled in the art readily recognizes how conventional computers and computer programs operate, how conventional input device drivers communicate with an operating system, and how a user conventionally utilizes input devices to initiate the manipulation of objects in a graphical user interface.

A graphical user interface (GUI) and operating system (OS) of the preferred embodiment reside within a computer-readable media and contain device drivers that allows one or more users to initiate the manipulation of displayed object icons and text on a display device. Any suitable computer-readable media may retain the GUI and operating system, such as ROM 116, RAM 114, disk and/or tape drive 120 (e.g., magnetic diskette, magnetic tape, CD-ROM, optical disk, or other suitable storage media).

In the preferred embodiments, the COSE.TM. (Common Operating System Environment) desktop GUI interfaces the user to the AIX.TM. operating system. The GUI may be viewed as being incorporated and embedded within the operating system. Alternatively, any suitable operating system or desktop environment could be utilized. Examples of other GUIs and/or operating systems include X11.TM. (X Windows) graphical user interface, Sun's Solaris.TM. operating system, and Microsoft's Windows 95.TM. operating system. It should be noted that the GUI and operating system merely instruct and direct CPU 110.

II. General Overview of the Components

Figure 2:
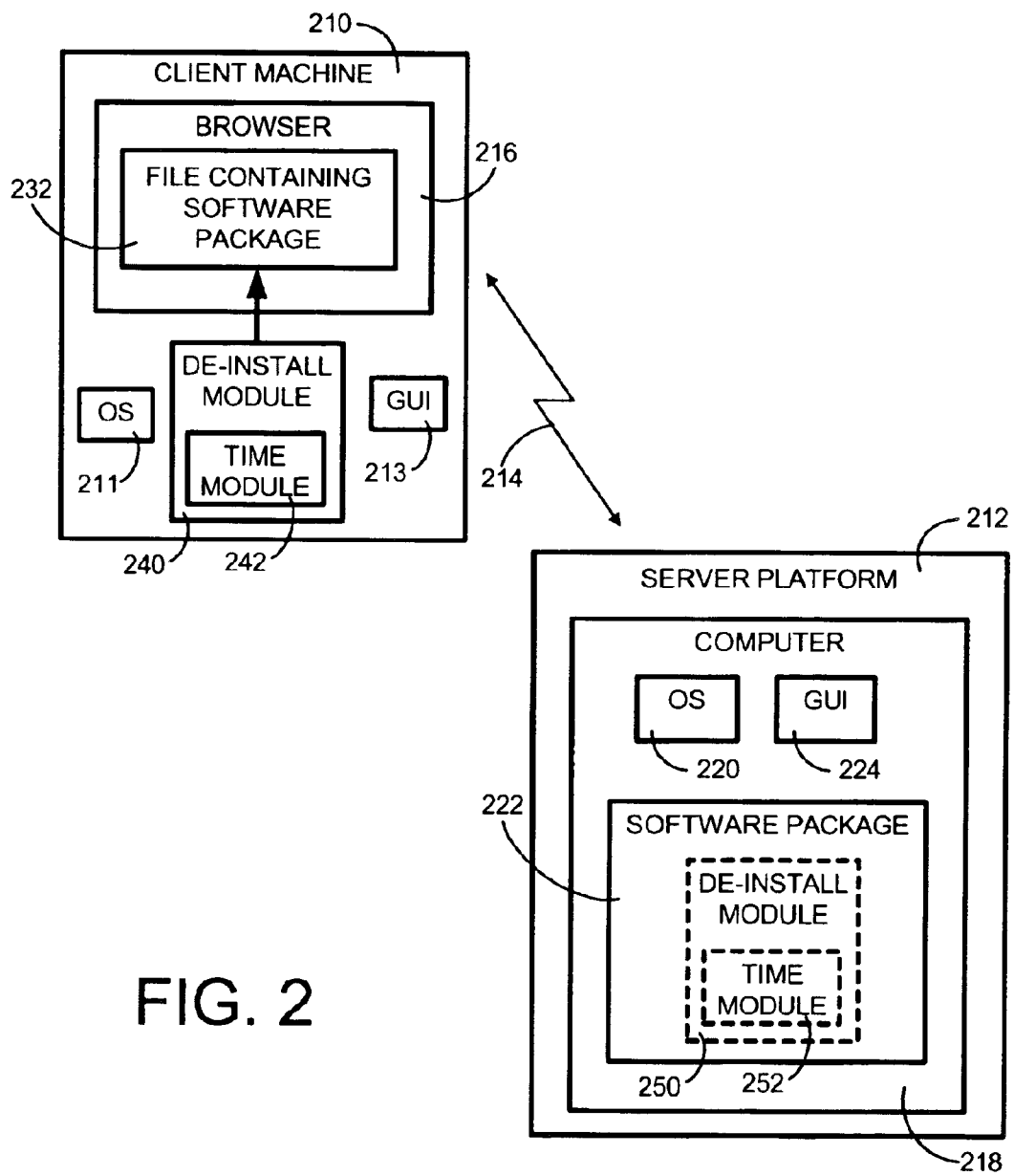
FIG. 2 is a block diagram showing further details of selected components of a network system implementing the present invention.

FIG. 2 is a block diagram showing further details of selected components of the present invention. A representative system in which the present invention is implemented is illustrated in FIG. 1. A client machine 210 is connected to a Web server platform 212 via a communication channel 214. For illustrative purposes, channel 214 is the Internet, an intranet or other known network connection. Web server platform 212 is one of a plurality of servers that are accessible by clients, one such client being illustrated by machine 210. A representative client machine includes an operating system 211, a graphical user interface 213, and a browser 216. A browser is a known software tool used to access the servers of a network, such as the Internet. Representative browsers include, among others, Netscape Navigator, Microsoft Internet Explorer or the like, each of which are "off-the-shelf" or downloadable software programs.

The Web server platform (sometimes referred to as a "Web" site) supports files in the form of hypertext documents and objects. Although any suitable platform can be used, one representative Web server platform 212, comprises an IBM RISC System/6000 computer 218 running the AIX (Advanced Interactive Executive) Operating System 220 and a Web server program 222, such as Netscape Enterprise Server Version 2.0, that supports interface extensions. The platform 212 also includes a graphical user interface (GUI) 224 for management and administration. The various models of the RISC-based computers are described in many publications of the IBM Corporation, for example, RISC System 6000, 7013 and 7016 POWERstation and POWERserver Hardware Technical Reference, Order No. SA23-2644-00.

AIX OS is described in AIX Operating System Technical Reference, published by IBM Corporation, First Edition (November 1985), and other publications. While the above platform is useful, any other suitable hardware/operating system/Web server combinations may be used.

For gaining access to software, the user can purchase the software in computer readable format at consumer stores. There are other ways for the user to gain access to software packages. For example, the user can download files or software packages 222. Namely, a remote client user 210 can connect to a particular host server 212, such as a WWW server and request access to the particular host server by specifying the name of the desired host server.

In one embodiment, the file containing the software package 222 includes a de-install module 240 with a time module 242. The de-install module 240 can be a module that is added to existing software packages 222 as part of the software's uninstall scheme. Thus, when the client machine 210 connects to the server computer 218, the software package 222 can be downloaded from the server 212 and stored on the client as a file containing the software package 232 with the de-install module and a time module included in the download.

Alternatively, a de-install module 250 with a time module 252 can be initially loaded as a stand alone software program that is installed on the client 210 before any software packages are download or installed on the client 210. In this case, the de-install module 250 is initiated at the start-up of the client computer 210 and then goes into a temporary hidden mode that stills stays resident. In other words, during this mode, the de-install module is active, but hidden from the user and only activated when the file containing the software package 232 initiates installation on the client computer 210. Details of the de-install module 250 and time module 252 will be discussed with reference to FIG. 3.

III. Details of the Operation

Figure 3:
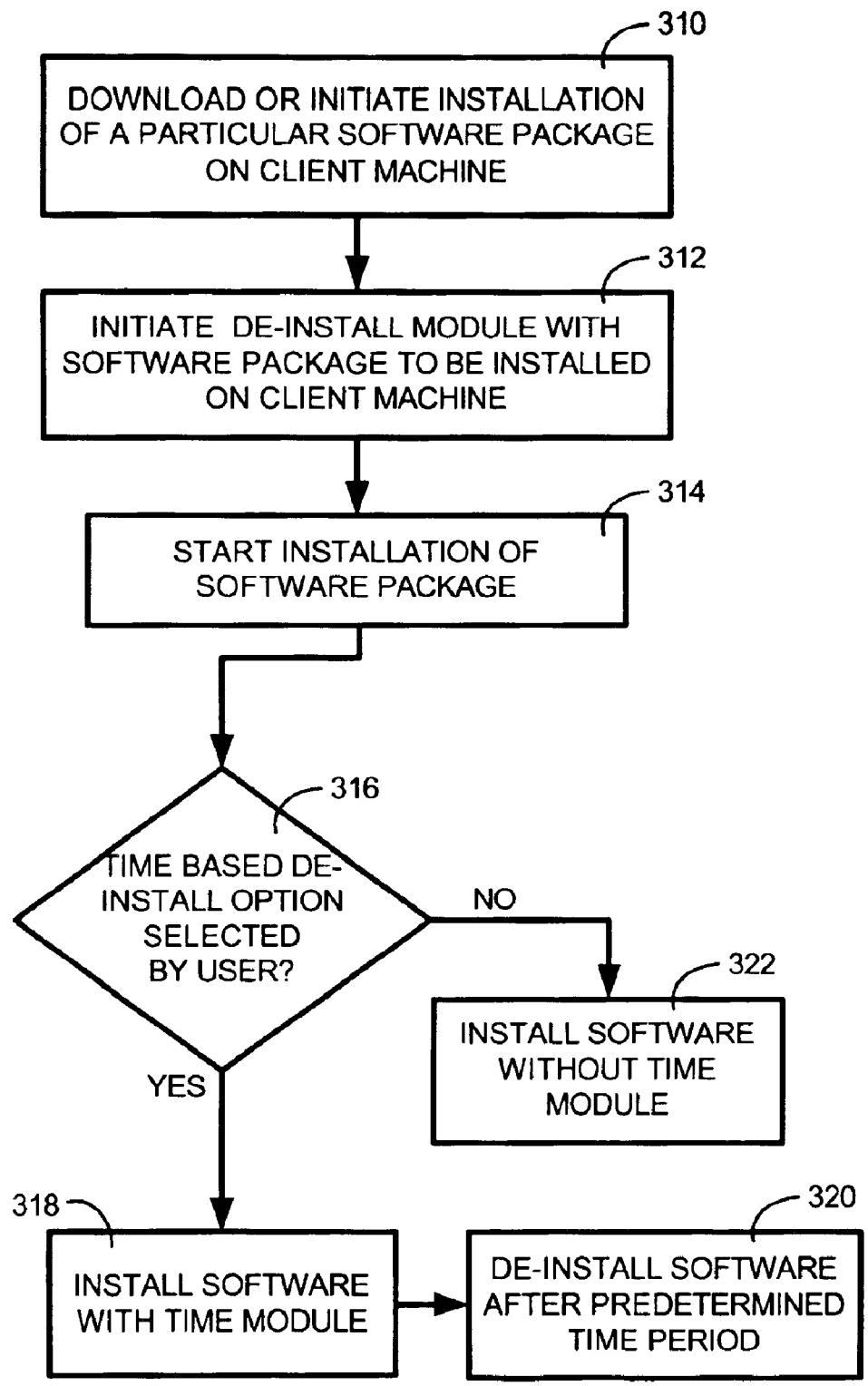
FIG. 3 is flowchart illustrating the operation of the invention.
Figure 4:
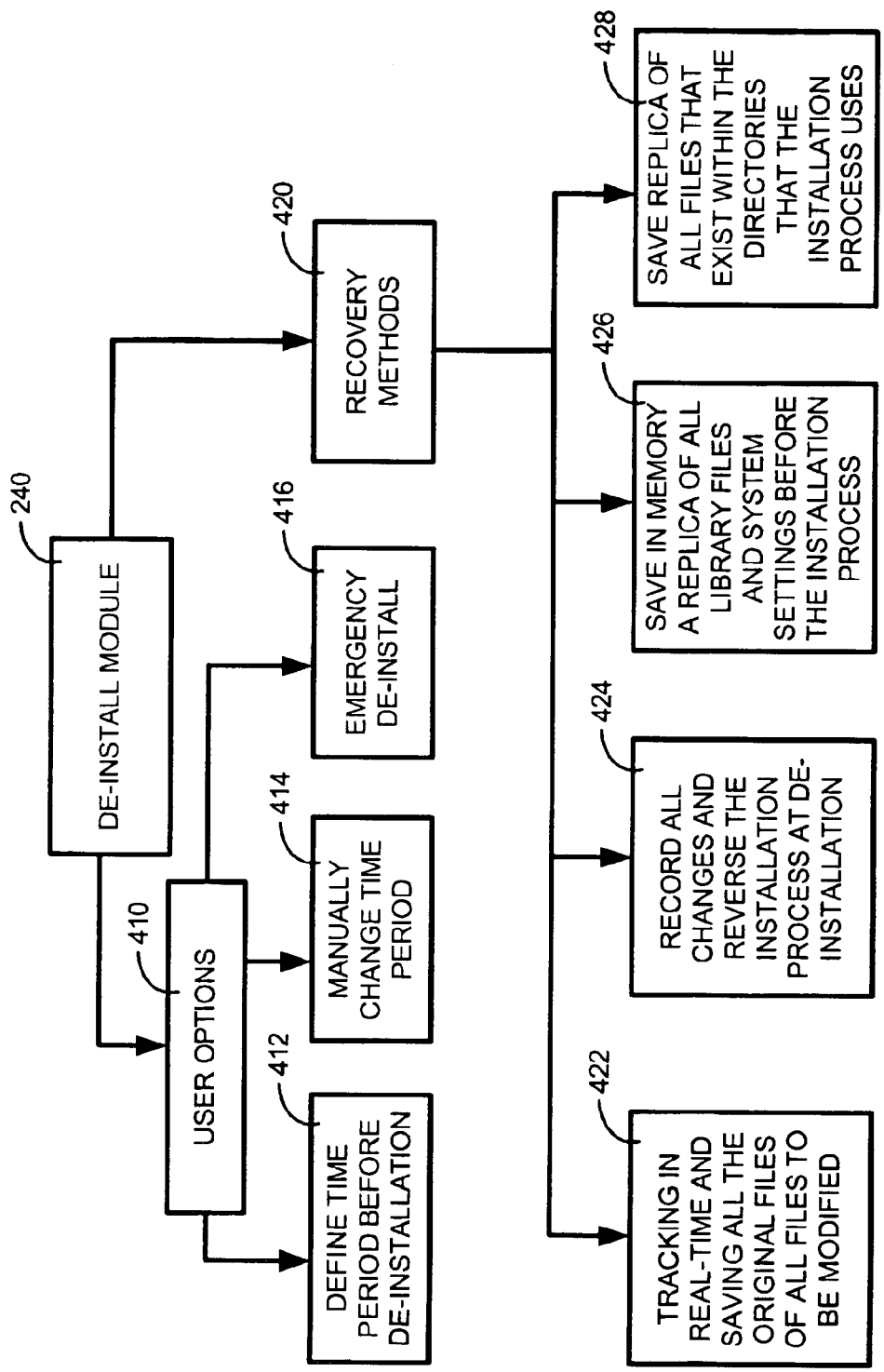
FIG. 4 is a block diagram illustrating details of the de-install module.

FIG. 3 is flowchart illustrating the operation of the invention and FIG. 4 is a block diagram illustrating the details of one of the components of the invention. Currently, in an AIX environment, when a new software package or fileset is installed without permanent committal to the fileset, the original binaries and libraries are saved in memory on the system. However, the user must manually write an uninstall cron (a cron is a Unix command for scheduling jobs to be executed sometime in the future) job specifically for that fileset in order to de-install the fileset. In contrast, the present invention allows dynamic customization of the de-install parameters with added flexibility and user defined preferences, such as time preferences, and can be done in reduced steps automatically.

In general, referring to FIGS. 3 and 4 along with FIGS. 1–2, first, the user downloads a particular software package, for example from the Internet or the World Wide Web, or initiates installation of the particular software package on the client machine (step 310). Second, the de-install module is initiated with the installation process so that it runs when the particular software package is installed on the client machine (step 312). Third, installation of the software package is started (step 314).

Fourth, before installation, the user can be provided with user options 410. One option 412 is to have the software package and all of its associated components automatically de-installed after a user defined period of time has elapsed (step 316). If the user chooses the automatic de-install option 412 based on a time period, the software package is installed with a time module (step 318), which can be set by the user or automatically set by the de-install module 240. Next, the software package is de-installed, including the de-install module, after the predetermined time period (step 320). Alternatively, if the user chose not to have automatic de-install based on the time period, the software is installed without time module (step 322).

Other options, which can be provided to the user after installation and before de-installation, include a manual change option 414 and an emergency de-install option 416. The manual change option 414 allows changes to the time period at any time during the period. This can occur if the user decides to keep the software package or if the user desires to increase or reduce the time period. The emergency de-install option 416 allows the user to immediately remove the software package under emergency circumstances, for example, if the user immediately notices destabilization of his/her computer or if annoying changes take place after installation of the software package.

The de-install module 240 can work together with or separately from the software package's included uninstall module to collect in computer memory file changes, such as adding, renaming, replacing, or adding data to existing system or library files, and log all activity that occurs during the installation process. Thus, the de-install module can get log information from the uninstall module of the software package or create a log on its own.

There are several recovery methods 420 that can be implemented as varying embodiments. In one embodiment 422, the de-install module 240 tracks in real-time the step by step activity of the installation process and interjects to save and store original files or system settings as backup copies just before the original files or settings are modified or deleted by the installation process. This allows the original files and/or settings to be completely restored when the software is de-installed. It should be noted that the de-install module will not write over original files if the original file is modified more than once.

Alternatively, in another embodiment 424, the de-install module 240 can collect in memory file changes (such as adding, renaming, replacing, or adding data to existing system or library files) that are made by the installation process. For example, the de-install module can digitally record in any suitable manner all changes and additions made to the system, including internal changes to the system or library file structures during installation of the software package. This allows the system to perform a reverse installation process for reverting the system back to exactly how it existed before the software package was installed. This removes unwanted files, restores stable files and fixes library incompatibilities caused by the installation of the software package. All activity that occurs during the installation process is logged so that the de-installation of the software is basically an exact reverse process of the installation.

In yet another embodiment 426, the de-install module 240 can save in memory a replica of all library files and system settings before the installation process and log the installation process so that any modified library file and/or settings can be completely restored when the software is de-installed. In another embodiment 428, the de-install module 240 can save a replica of all files that exist within the directories that the installation process uses. Any suitable user interface can be used to provide the options to the user, such as drop down menus, pop-up menus, window consoles, or the like.

For instance, in one working example, a user downloads a demo or trial graphics application software package from the Internet, such as the World Wide Web. If this is a new graphics application software package, it will most likely include the latest graphics libraries and functions available from the operating system vendor, which could include software patches from the manufacturer of the operating system. However, if the user already has a very stable and trusted system that does not have conflicts or anomalous behavior and he/she is satisfied with the system, the present invention will prevent destabilization or changes to the system by newly installed software packages.

With the present invention, after the user downloads and starts installation of the software package, the de-install module 240, 250 provides a graphical user interface, such as a pop-up menu, window console, shortcut menu or the like, with time de-install options to the user. One option includes initiating the time module 242, 252, which gives the users a time period that the new software package is to exist on the computer system. If the new software package is a demo or trial software package based on a time period, the user can coincide the de-installation of the software package with the length of the trial period.

Next, a follow-up pop-up graphical user interface menu appears giving the user the option to be notified before automatic installation take place. During installation of the new software package, the de-install module 240, 250 safely stores the original files and libraries that are changed or modified by the new software package to allow exact recovery of the system when the software package is de-installed. This also means that disk space will not be used by expired, unused, forgotten or unknown software packages. This is especially useful when users are reluctant and hesitant to remove a long-unused binary file because they are unsure if that file is key to some program.

IV. Conclusion

The present invention provides automatic de-installation of previously installed software based on user defined preferences to prevent trial, demo or unwanted software and its components from being unnecessarily kept on the user's computer. An advantage of the present invention is that it gives the user added confidence that damage or destabilization will not occur to the user's computer when installing and then uninstalling demo or trial version software packages. Namely, undesirable or annoying changes to the computer that occur after installation of the software package will disappear when the de-install module reverts the computer to the previous configuration after the user defined period of time elapses. Further, the present invention provides a convenient way for beta testers to install, test and then completely de-install software packages so that the beta testers can test hundreds of software packages without destabilizing their systems.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for installing software packages on a computer system, comprising:
    installing a software package;
    defining, by a user during installation of the software package, a specified period of time related to de-installation of the software package; and
    initiating a de-install module when installing the software package, the de-install module allowing for automatically de-installing the software package as soon as the specified period of time has elapsed.

2. The method of claim 1, wherein defining a specified period of time comprises automatically setting the specified period of time as a predefined expiration date of the software package.

3. The method of claim 1, further comprising completely restoring an original configuration existing before the software installation with the de-install module.

4. The method of claim 3, further comprising tracking in real-time step by step activity of the software installation and interjecting to save and store original files as backup copies just before original files are modified or deleted by software installation.

5. The method of claim 2, further comprising providing the user with an emergency de-install option to override the user defined period of time so that de-installation can occur at any time at an emergency request by the user.

6. The method of claim 1, wherein the computer is a client machine and further comprising downloading the software from a server via a network connection.

7. The method of claim 1, further comprising initiating the de-install module when the computer starts to make the de-install module active and hiding existence of de-install module to the user.

8. The method of claim 7, further comprising activating the de-install module so that it is apparent to the user when software initiates installation on the computer.

9. The method of claim 1, wherein the de-install module is incorporated with existing software as part of an uninstall module of the software.

10. A software management system for managing software installations on a computer, comprising:
    a de-install module that is initiated when the software is installed on the computer, wherein the de-install module is configured to allow a user to define a specified period of time related to de-installation of the software during installation of the software; and
    a time module to allow a user an option to have the software and all of its associated components automatically de-installed with the de-install module after as soon as the specified period of time has elapsed.

11. The software management system of claim 10, wherein an original configuration existing before the software installation is completely restored with the de-install module.

12. The software management system of claim 11, wherein the de-install module collects and logs in memory all activity of the software installation and all changes made to the original configuration for completely restoring the original configuration.

13. The software management system of claim 10, wherein the de-install module is initiated when the computer starts to make the de-install module active and the existence of the de-install module is hidden from the user.

14. The software management system of claim 13, wherein the de-install module is activated when software initiates installation on the computer so that it is apparent to the user.

15. The software management system of claim 10, further comprising an emergency de-install option to override the user defined period of time so that de-installation can occur at any time at an emergency request by the user.

16. The software management system of claim 10, wherein the computer is a client machine and further comprising downloading the software from a server via a network connection.

17. The software management system of claim 16, wherein the network connection is the Internet.

18. A computer-readable medium having computer-executable instructions for performing a process on a computer, the process comprising:
    initiating a de-install module when software is installed on computer;
    defining, by a user during installation of the software package, a specified period of time related to de-installation of the software package; and
    providing a user with an option to have the software and all of its associated components automatically de-installed with the de-install module as soon as the specified period of time has elapsed.

19. The process of claim 18, further comprising completely restoring an original configuration existing before the software installation with the de-install module.

20. The process of claim 19, further comprising collecting and logging in memory all activity of the software installation and all changes made to the original configuration for completely restoring the original configuration.

* * * * *